United States Patent
Kulkarni et al.

(10) Patent No.: US 10,652,100 B2
(45) Date of Patent: May 12, 2020

(54) COMPUTER SYSTEM AND METHOD FOR DYNAMICALLY ADAPTING A SOFTWARE-DEFINED NETWORK

(71) Applicant: SIEMENS AKTIENGESELLSCHAFT, München (DE)

(72) Inventors: Vivek Kulkarni, Unterhaching (DE); Ermin Sakic, München (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 16/341,442

(22) PCT Filed: Oct. 6, 2017

(86) PCT No.: PCT/EP2017/075448
§ 371 (c)(1),
(2) Date: Apr. 11, 2019

(87) PCT Pub. No.: WO2018/069171
PCT Pub. Date: Apr. 19, 2018

(65) Prior Publication Data
US 2019/0268237 A1    Aug. 29, 2019

(30) Foreign Application Priority Data
Oct. 12, 2016  (DE) .......................... 10 2016 219 854

(51) Int. Cl.
*G06F 15/173* (2006.01)
*H04L 12/24* (2006.01)

(52) U.S. Cl.
CPC .................... *H04L 41/12* (2013.01)

(58) Field of Classification Search
CPC ....... H04L 41/046; H04L 41/12; H04L 41/08; H04L 41/24
See application file for complete search history.

(56) References Cited

U.S. PATENT DOCUMENTS 10,205,638 B1*  2/2019  Angrish .................. H04L 41/22
2014/0244851 A1*  8/2014  Lee ...................... H04L 12/4641
709/228

(Continued)

FOREIGN PATENT DOCUMENTS

| CN | 103596652 A | 2/2014 |
|---|---|---|
| EP | 3016316 A | 5/2016 |
| WO | WO2015096758 A1 | 7/2015 |

OTHER PUBLICATIONS

Basta, Arsany, et al. "HyperFlex: Demonstrating control-plane isolation for virtual software-defined networks." 2015 IFIP/IEEE International Symposium on Integrated Network Management (IM). IEEE, 2015.

(Continued)

*Primary Examiner* — Jonathan A Bui
(74) *Attorney, Agent, or Firm* — Lempia Summerfield Katz LLC (57) ABSTRACT

Computer system and method for dynamically adapting a software-defined network A computer system for dynamically adapting a software-defined network is suggested. The computer system comprises a plurality of virtual domains, each virtual domain comprising a network controller to which a back-up network controller is assigned, wherein the network controller is adapted to manage a plurality of switches being assigned to the virtual domain, wherein the software-defined network is partitioned into the plurality of virtual domains, and a root controller, wherein the root controller is adapted to manage the software-defined network by dynamically adding and/or removing virtual domains based on a threshold of the software-defined network, wherein a back-up root controller is assigned to the root controller. Further, a method for dynamically adapting a software-defined network is suggested. The suggested computer system provides the advantage of a dynamical (Continued)

adaptation of the software-defined network and at the same time, due to the back-up controllers, an improved fault-tolerance.

13 Claims, 4 Drawing Sheets

(56) References Cited

U.S. PATENT DOCUMENTS

| | | | |
|---|---|---|---|
| 2014/0337500 A1* | 11/2014 | Lee | H04L 41/12 709/223 |
| 2015/0163151 A1 | 6/2015 | Li | |
| 2015/0188837 A1* | 7/2015 | Djukic | H04L 47/785 709/226 |
| 2018/0123895 A1* | 5/2018 | Khasnabish | H04L 12/4641 |
| 2018/0210750 A1* | 7/2018 | Cui | G06F 9/45558 |
| 2018/0302316 A1* | 10/2018 | Ubaldi | H04L 45/125 |
| 2019/0356535 A1* | 11/2019 | Li | H04L 43/0811 |

OTHER PUBLICATIONS

Civanlar, Seyhan, et al. "Distributed management of service-enabled flow-paths across multiple sdn domains." 2015 European conference on networks and communications (EuCNC). IEEE, 2015.

Noble, Brian, Ben Fleis, and Minkyong Kim. "A case for fluid replication." Proceedings of the 1999 Network Storage Symposium (Netstore). 1999.

PCT International Search Report and Written Opinion of International Searching Authority dated Dec. 20, 2017 corresponding to PCT International Application No. PCT/EP2017/075448 filed Oct. 6, 2017.

PCT International Preliminary Report dated Sep. 7, 2018 corresponding to PCT International Application No. PCT/EP2017/075448 filed Oct. 6, 2017.

Chinese Office Action for Chinese Application No. 2017800632427 dated Sep. 30, 2019.

* cited by examiner

COMPUTER SYSTEM AND METHOD FOR DYNAMICALLY ADAPTING A SOFTWARE-DEFINED NETWORK

This application is the National Stage of International Application No. PCT/EP2017/075448, filed Oct. 6, 2017, which claims the benefit of German Patent Application No. 10 2016 219 854.8, filed on Oct. 12, 2016. The entire contents of these documents are hereby incorporated herein by reference.

BACKGROUND

The present embodiments relate to dynamically adapting a software-defined network.

In large software-defined networks (SDN networks) with massively distributed network nodes and end devices, the scalability of the SDN controller may be difficult. The performance and stability of a single SDN controller may be affected due to the large SDN network.

In addition to scalability issues, fault-tolerance of the control plane is an important requirement for applying SDN in practice in industrial applications. In single-controller deployments, the SDN controller is a single point of failure (SPOF) in the control network. Since no system may be assumed to be 100% available, backup controllers are to be deployed to offset the SPOF property.

Multiple approaches present Control Plane (CP) slicing, where network users (e.g., tenants) are offered a slice of physical resources (CP multi-tenancy) and, in addition, are provided a way to orchestrate the resources as per corresponding application needs. Therefore, there is a need for a concept that facilitates SDN controllers per network resource slice and paves the way for on-demand network services.

Fluid Replication (Noble, B., Fleis, B., Kim, M., (1999), A Case for Fluid Replication) is a service replication strategy that detects changes in demand for services and resources and automatically replicates services when and where necessary. By fluid replication, servers that host the service necessary to serve a client's request are dynamically deployed closer to the user (e.g., client of the service), hence enabling access to service with lower overall delay experienced by a user. These replicas are placed on WayStations— service nodes in the infrastructure that provide replication services.

Civanlar, S., Lokman, E., Kaytaz, B., & Tekalp, A. M. (2015), Distributed management of service-enabled flow-paths across multiple SDN domains, 2015 European Conference on Networks and Communications, EuCNC 2015, 360-364, http://doi.org/10.1109/EuCNC.2015.7194099, proposes that each SDN controller shares with other SDN controllers a summarized view of a corresponding network graph, which is essentially an equivalent virtual network between corresponding gateway forwarders, and the associated service capabilities.

Basta, A., Blenk, A., Lai, Y. T., & Kellerer, W. (2015), HyperFlex: Demonstrating control plane isolation for virtual software-defined networks, Proceedings of the 2015 IFIP/IEEE International Symposium on Integrated Network Management, IM 2015, 1163-1164, http://doi.org/10.1109/INM.2015.7140460, introduces the concept of an SDN hypervisor to support the multi-tenancy requirements in the SDN Control plane. A set of physical resources are assigned to different network tenants, and the tenants are allowed the access to a corresponding assigned share by making reservation requests at a logical instance of an Network Controller.

The international patent application WO 2015/096758 A1 discloses a network having a hierarchical SDN architecture, where the network is sub-divided into multiple regions, and each region is assigned to a different SDN controller for collecting network status information to be fed to a root SDN controller. The SDN controller computes costbased parameters for distribution to regional SDN controllers for locally adapting resources.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a software-defined network with improved scalability and fault-tolerance is provided.

A computer system for dynamically adapting a software-defined network is provided. The computer system includes a plurality of virtual domains. Each virtual domain of the plurality of virtual domains includes a network controller to which a backup network controller is assigned. The network controller is adapted to manage a plurality of switches being assigned to the virtual domain. The software-defined network is partitioned into the plurality of virtual domains. The computer system also includes a root controller. The root controller is adapted to manage the software-defined network by dynamically adding and/or removing virtual domains based on a threshold of the software-defined network. A back-up root controller is assigned to the root controller.

The respective entity (e.g., the network controller) may be implemented in hardware and/or in software. If the entity is implemented in hardware, the entity may be embodied as a device (e.g., as a computer or as a processor or as a part of a system such as a computer system). If the entity is implemented in software, the entity may be embodied as a computer program product, as a function, as a routine, as a program code, or as an executable object.

Known mechanisms may not instantiate software-defined network (SDN) controllers on demand to solve scalability or performance issues. The suggested computer system is able to provide an on-demand instantiation of virtual domains and corresponding network controllers during runtime (e.g., in industrial applications).

According to the suggested computer system, the software-defined network is partitioned into sub-domains (e.g., virtual domains). The virtual domains include network nodes and switches, both physical and virtual network components, which are physically separated. The virtual domains may consist of virtual and/or physical resources that are virtually/logically grouped into virtual domains.

By partitioning the overall data-plane into sub-domains, the burden on the master (root) controller may be reduced for scalability purposes.

Each controller, the root controller, as well as the lower order network controllers, has a back-up controller for high availability purposes. The network controllers manage their own virtual domain, whereas the root controller manages the root domain (e.g., the network controllers but not the underlying virtual domains).

Thus, the root domain is managed by the root controller and a replicated instance of the root domain is managed by the back-up root controller. In addition to bootstrapping the SDN network and managing the root domain after domain partitioning, the root controller may also instantiate the network controllers and the back-up network controllers in newly created domains.

The root controller may deploy the back-up root controller (e.g., replica of itself) in the root domain for the purpose of high availability. The knowledge inside the non-root domains (e.g., the virtual domains) is abstracted to the root controller after successful partitioning of the SDN network in virtual domains and a controller instantiation process (e.g., after the first instantiation of a network controller or after the removal of a network controller). Hence, the scalability of the control plane is enabled by summarizing the state information exchanged in between the different domains.

Back-up and network controllers may be deployed on any hosts and servers that support the required resources for controller execution. Hence, the root controller is aware of available and utilized resources on the host/server. When sufficient CPU, memory, and disk resources are available, the hosts may run the user applications in addition to controller instances.

Virtual networks with arbitrary big numbers of virtual switches, or isolated physical networks (e.g., industry/factory automation cells) may require a control that is isolated from the network core. For this purpose, the root controller may instantiate a network controller that limits a corresponding control scope to only that virtual network or industry/factory automation cell.

According to an embodiment, the threshold of the software-defined network is a number of overall switches, a number of switches per virtual domain, a load of the overall software-defined network, a load of the network controllers, or any combination thereof.

The threshold may be set manually or automatically. For example, the threshold may be a design choice of the respective network. The load may be, for example, interpreted by network parameters such as utilized bandwidth, processing delay, processing capacity, etc.

According to a further embodiment, the root controller is adapted to add a new virtual domain if the threshold of the software-defined network is exceeded, and is adapted to assign a subset of the switches to the new virtual domain.

For example, if the number of switches per virtual domain is above the threshold for the number of switches per virtual domain, the root controller may add a new virtual domain and may re-assign the existing switches to the existing and the new virtual domain.

According to a further embodiment, the root controller is adapted to remove a virtual domain if the threshold of the software-defined network is underrun, and is configured to re-assign a subset of the switches being included in the removed virtual domain to the plurality of virtual domains.

For example, if the number of switches is below the threshold for the number of switches per virtual domain, this domain is removed and the switches of this domain are re-assign to the remaining virtual domains.

According to a further embodiment, the back-up network controller is adapted to monitor the network controller and to determine a fault of the network controller.

As long as the network controller works, the function of the back-up network controller is to monitor the status of the network controller. If a fault (e.g., a breakdown) of the network controller is determined, the back-up network controller is adapted, according to a further embodiment, to take over the management of the corresponding virtual domain.

According to a further embodiment, the back-up network controller is adapted to continue an actual session of the corresponding virtual domain.

This provides that the back-up network controller takes over the status of the failed network controller. Thus, the virtual domain and the switches of this network controller recognize that there was a fault of the network controller and connect to the configured back-up controller.

According to one or more of the present embodiments, the back-up root controller is adapted to monitor the root controller and to determine a fault of the root controller.

Not only the network controllers but also the root controller has a redundant controller. Thus, the back-up root controller functions as described with reference to the back-up controller.

According to one or more of the present embodiments, the back-up root controller is adapted to take over the management of the software-defined network.

In contrast to the lower order back-up controllers, the back-up root controller takes over the management of the complete SDN network.

According to a further embodiment, the root controller is adapted to control the network controllers, back-up network controllers, and switches in a root domain.

This provides that the root controller does not necessarily have any knowledge about the organization of the single virtual domains, but only cooperates with the network controllers and back-up network controllers of the virtual domains as well as with the switches directly assigned to the root controller.

According to a further embodiment, the root controller is adapted to receive a request for instantiating a new tenant network and is adapted to add a new virtual domain according to this request.

In addition to the adaption of the network based on the threshold, the root controller may adapt the network also based on a received request.

According to a further embodiment, each switch of the plurality of switches has a plurality of physical and/or virtual interfaces.

This provides that each switch may have several interfaces via which the switch may communicate (and be part of) several virtual domains. The interfaces may be physical or virtual interfaces.

According to a further embodiment, the root controller, the back-up root controller, the network controllers, and the back-up network controllers are included in a software-defined network controller.

Thus, the SDN controller of the suggested computer system may include several sub-controllers.

An example of the acts, how the SDN controller may be created on demand, is described in the following phase transitions, from planning to runtime.

In a Network Planning Phase, an arbitrarily large SDN network is assumed consisting of SDN-enabled switches and a single SDN controller that functions as the root controller. While an out-of-band control is easier but more expensive to achieve, the more realistic in-band control scenario will be assumed in the following, where the SDN controllers are routing the switch-control and synchronization messages through the data plane. Data plane forwarding capacity may hence be shared between the control and user traffic.

In a Bootstrapping Phase, as soon as the root controller is loaded, initial control sessions are established between the root controller and SDN-Switches. The controller is internally triggered to move to the next phase and hence partition the network into multiple domains. Triggering may, for example, be based on a pre-defined threshold of maximum supported switches per-domain.

In a Partitioning Phase, the root controller partitions the SDN network into logical partitions with "root domain" being the partition controlled by the root controller and a number of "domain" partitions, which are referred to above as "virtual domains".

In an Instantiation Phase, the root controller may provide every single of the domains (e.g., including both root domain and virtual domains) is controlled by at least two controller instances (e.g., a "main" domain controller and a back-up domain controller). After identifying the domains, the root controller instantiates the domain and back-up domain controllers using any controller-deployment function.

In an Abstraction Phase, as soon as the domain and back-up controllers are deployed in corresponding domains, the root controller establishes peer-to-peer sessions with the remote domain controllers (e.g., network controllers). The root controller then modifies the controller lists at the remote switches, and changes an own role from Master to Slave. Additionally, the root controller adds the remote domain controller as master controller of that switch (e.g., network controller) and adds the remote domain back-up controller as the first slave controller of the switch (e.g., back-up controller). Hence, the root controller registers itself as the second slave controller at the switch.

From this moment onwards, the root controller is not directly tracking the resources of the switches in the remote or virtual domains. All requests to establish the flows are negotiated in between the controllers in the two domains across which the connection is to be established.

In a Runtime Phase, during normal operation, the root controller may be assigned with following tasks: Control of the switches in the root domain, liveness evaluation of controllers in other domains, serve as the gateway for requests to instantiate new tenant networks. Further, should additional switches (or "virtual networks hosted on servers"/ cells) be physically attached to existing domains, the root controller may detect the topology change and evaluate the number of admitted switches. The root controller may then decide if the new devices are to be reassigned to an existing domain, or if a new domain is to be created. Depending on the threshold of admissible switches in that domain (e.g., no capacity in existing domains, or on detection of virtual networks or cells), the root controller may create a new domain or add the new device to an existing domain (e.g., if sufficient capacity is available).

In an act of Controller Instantiation Triggers, on detection of a larger-than-acceptable number of switches in a single control domain, the exceeding switches may be reassigned to a controller in a different domain. In case no existing neighbouring domains may take over the control of the exceeding switches (e.g., switch capacity per domain exceeded), a new logical domain is created. A new domain controller and back-up domain controller instances are deployed in this domain with the task to control these exceeding switches and future switches assigned to this domain. On detection of a failure of a controller in a remote domain, the failure is detected by the backup domain controller in that domain and the root controller in the root domain. This leads to back-up controller taking over the role of master network controller in the affected domain. The root controller may then instantiate a new back-up controller in the affected domain. The new back-up controller is initialized with the state information replicated from the now master network controller.

According to a further aspect, a method for dynamically adapting a software-defined network is provided.

The embodiments and features described with reference to the computer system of one or more of the present embodiments apply to the method of the present embodiments.

According to a further aspect, a computer program product including a program code for executing the above-described method for dynamically adapting a software-defined network when run on at least one computer is provided.

A computer program product may be embodied as a memory card, USB stick, CD-ROM, DVD (e.g., non-transitory computer-readable storage medium), or as a file that may be downloaded from a server in a network. For example, such a file may be provided by transferring the file including the computer program product from a wireless communication network.

Further possible implementations or alternative solutions of the present embodiments also encompass combinations, which are not explicitly mentioned herein, of features described above or below with regard to the embodiments. The person skilled in the art may also add individual or isolated aspects and features to the most basic form of the present embodiments.

BRIEF DESCRIPTION OF THE DRAWINGS

In the figures, like reference numerals designate like or functionally equivalent elements, unless otherwise indicated.

DETAILED DESCRIPTION

Figure 1:
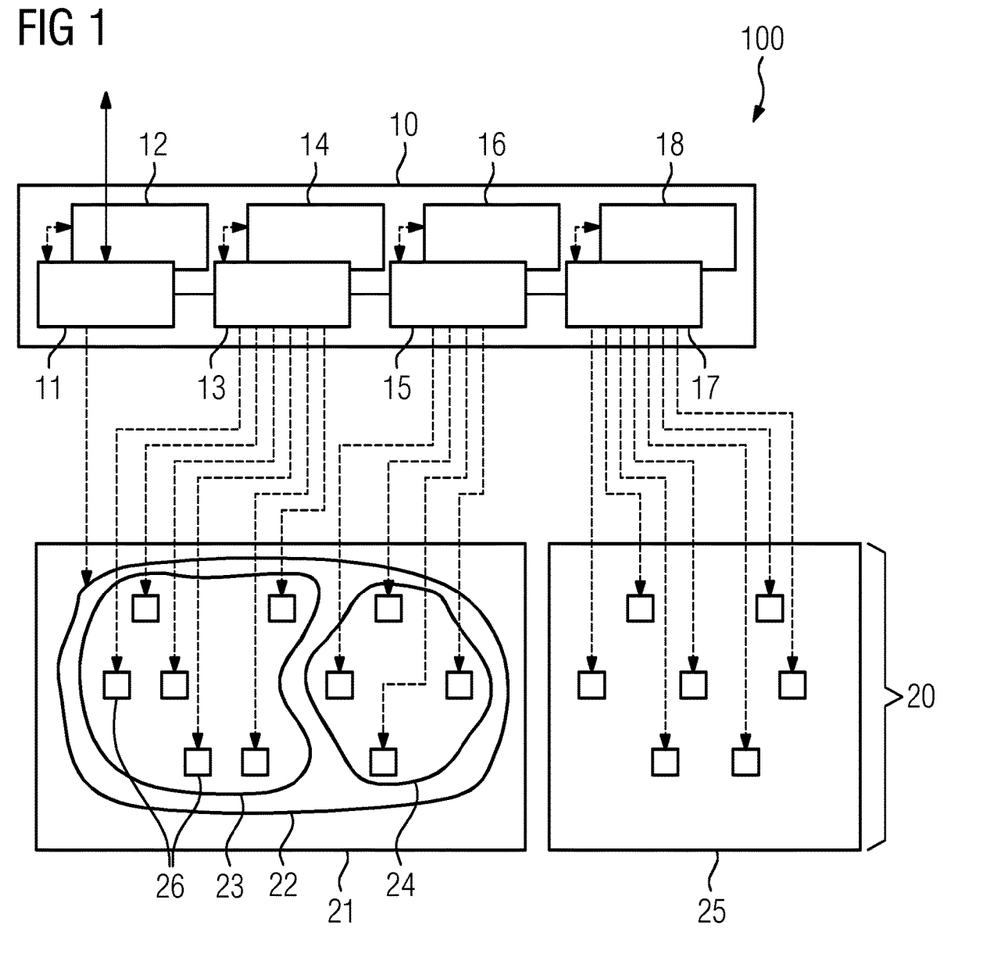
FIG. 1 shows a schematic block diagram of a first embodiment of a computer system.

FIG. 1 shows one embodiment of a computer system 100 for dynamically adapting a software-defined network 20.

The computer system 100 includes a plurality of virtual domains 22, 23, 24, 25. Each virtual domain of the plurality of virtual domains 22, 23, 24, 25 include a network controller 13, 15, 17 to which a back-up network controller 14, 16, 18 is assigned. The network controllers 13, 15, 17 are configured to manage a plurality of switches 26 being assigned to each virtual domain 22, 23, 24, 25.

The SDN network 20 is portioned into physical forwarding devices 21 as well as virtual forwarding devices 25. The virtual domains 22, 23, 24, 25 may be included only in one of these partitions 21, 25 or may extend over these partitions 21, 25. The root domain 22 is assigned to a root controller 11 and a corresponding back-up controller 12.

The root controller 11 manages the software-defined network 20 by dynamically adding and/or removing virtual domains 21, 22, 23, 24, 25 based on a threshold of the software-defined network 20.

The root controller 11 may further communicate with external management applications.

Figure 2:
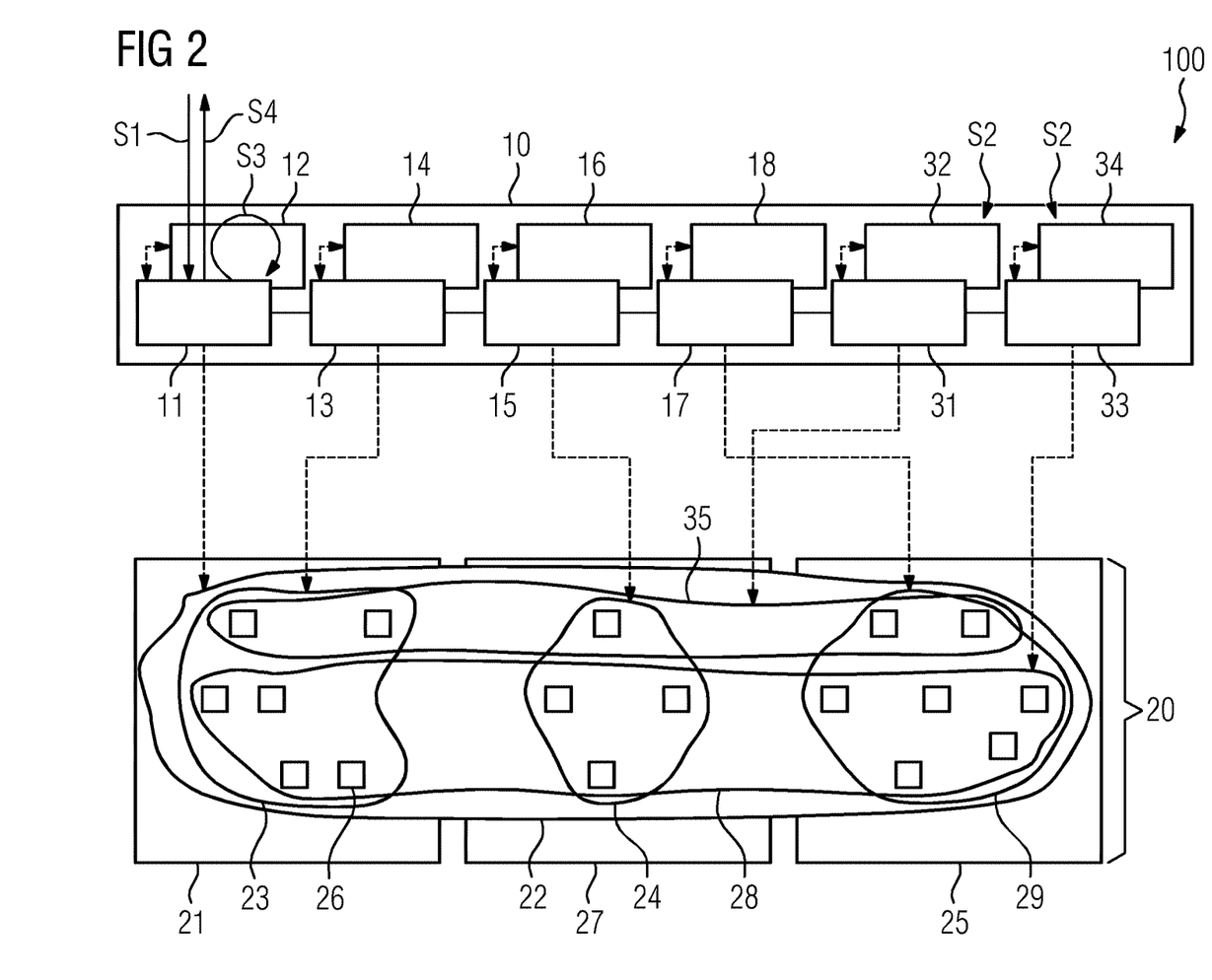
FIG. 2 shows a schematic block diagram of a second embodiment of a computer system.

FIG. 2 shows an example of the computer system 100, in which, on detection of a request for a new tenant network 28, 35, a new tenant controller instance 31, 32, 33, 34 is instantiated. In addition to FIG. 1, the SDN network 20 includes an additional partition of physical forwarding devices 27. The detailed sequence is as follows.

In act 1 (S1), a request comes from the external management application to create a certain tenant based on the specific requirements such as device types, interface types, domains to be covered, etc. The external management application is to be authenticated and authorized before the request may be processed inside the SDN controller 10.

In act 2 (S2), based on the topology database, a tenant view is created at the root controller 11. The root controller 11 instantiates a controller instance 31, 33 for that tenant view.

In act 3 (S3), the root controller 11 generates an interface of the instantiated tenant controllers (e.g., the main controllers 31, 33 and the back-up controllers 32, 34) for the tenant or external management application.

Redundancy of the controllers (e.g., fault-tolerant design) may be transparent to the external management application.

In act 4 (S4), the root controller 11 provides a list of instantiated controllers 11, 12, 13, 14, 15, 16, 17, 18, 31, 32, 33, 34 and the related interface information to the tenant or external management application.

Figure 3:
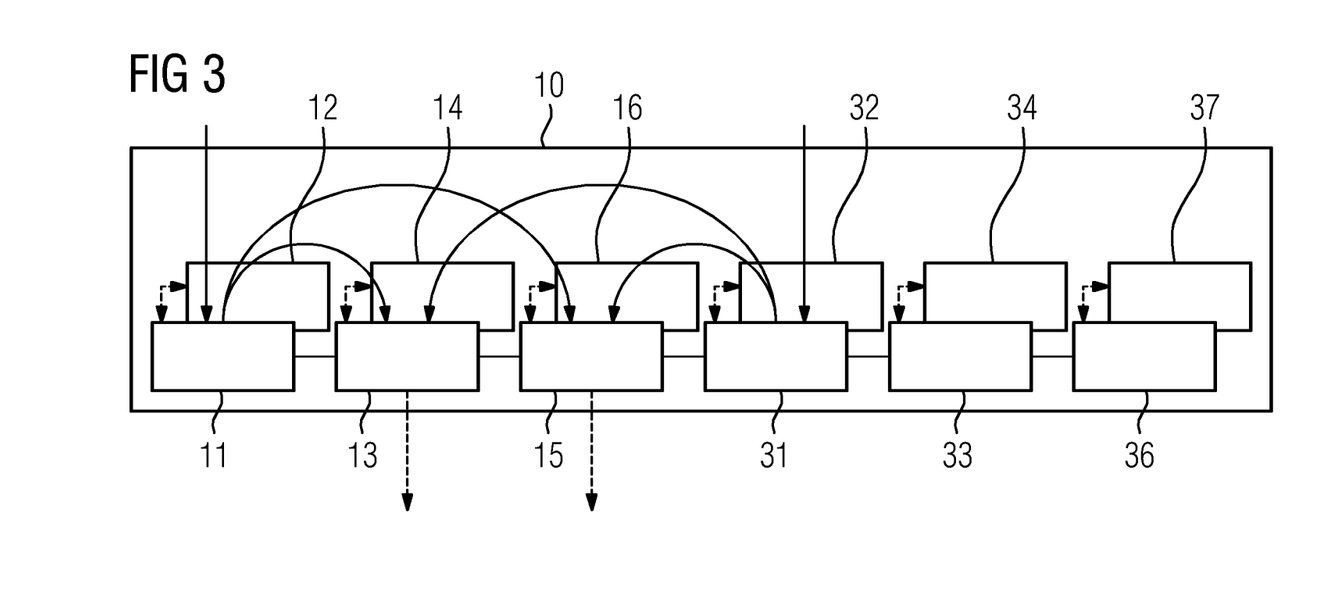
FIG. 3 shows a schematic block diagram of a SDN controller used in the computer system of FIGS. 1 and 2.

FIG. 3 shows a schematic block diagram of the SDN controller 10 used in the computer system 100 of FIGS. 1 and 2. The zoning principle used in this SDN controller 10 will be described in the following.

For scalability reasons, although the root controller 11 has information of all the domains, the root controller 11 does not have internal SDN nodes information pertaining to each domain. Each domain controller 13, 14, 15, 16 is responsible for own SDN nodes and may configure only those nodes. Similarly, a tenant controller instance 31, 32, 33, 34, 36, 37 may request each domain controller 13, 14, 15, 16 to configure SDN nodes bases on corresponding requirements.

Figure 4:
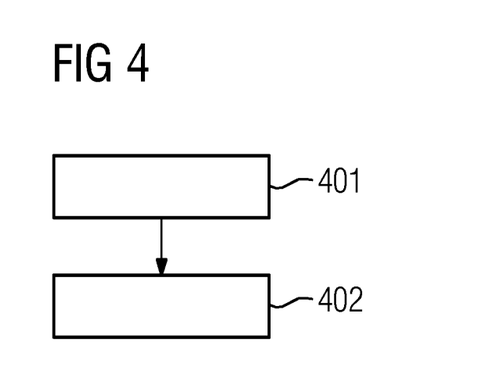
FIG. 4 shows a sequence of acts of one embodiment of a method for dynamically adapting a SDN network.

FIG. 4 shows one embodiment of a method for dynamically adapting a software-defined network 20. The software-defined network 20 is partitioned into a plurality of virtual domains 23, 24, 28, 29, 35. Each virtual domain of the plurality of virtual domains 23, 24, 28, 29, 35 includes a network controller 13, 15, 17, 31, 33, 36 to which a back-up network controller 14, 16, 18, 32, 35, 37 is assigned. The software-defined network 20 includes a root controller 11. A back-up root controller 12 is assigned to the root controller 11. The method includes the following acts.

In a first act 401, a plurality of switches 26 being assigned to the virtual domains 23, 24, 28, 29, 35 are managed.

In a second act 402, the software-defined network 20 is managed by dynamically adding and/or removing virtual domains 23, 24, 28, 29, 35 based on a threshold of the software-defined network 20.

Although the present invention has been described in accordance with exemplary embodiments, it is obvious for the person skilled in the art that modifications are possible in all embodiments.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A computer system for dynamically adapting a software-defined network, the computer system comprising:
   a plurality of virtual domains, each virtual domain of the plurality of virtual domains comprising a network controller to which a back-up network controller is assigned, wherein the respective network controller is configured to manage a plurality of switches being assigned to the respective virtual domain, and wherein the software-defined network is partitioned into the plurality of virtual domains; and
   a root controller configured to manage the software-defined network, the management of the software-defined network comprising dynamic addition, removal, or addition and removal of virtual domains based on a threshold of the software-defined network,
   wherein a back-up root controller is assigned to the root controller,
   wherein the back-up root controller is configured to:
      monitor the root controller; and
      determine a fault of the root controller, and
   wherein the back-up root controller is configured to take over the management of the software-defined network.

2. The computer system of claim 1, wherein the threshold of the software-defined network is a number of overall switches, a number of switches per virtual domain, a load of the overall software-defined network, a load of the network controllers, or any combination thereof.

3. The computer system of claim 1, wherein the root controller is configured to:
   add a new virtual domain when the threshold of the software-defined network is exceeded; and
   assign a subset of the switches to the new virtual domain.

4. The computer system of claim 1, wherein the root controller is configured to:
   remove a virtual domain when the threshold of the software-defined network (20) is underrun; and
   re-assign a subset of the switches being included in the removed virtual domain to the plurality of virtual domains.

5. The computer system of claim 1, wherein the back-up network controller is configured to:
   monitor the network controllers; and
   determine a fault of the network controller.

6. The computer system of claim 5, wherein the back-up network controller is configured to take over the management of the corresponding virtual domain.

7. The computer system of claim 6, wherein the back-up network controller is configured to continue an actual session of the corresponding virtual domain.

8. The computer system of claim 1, wherein the root controller is configured to control the network controllers, the back-up network controllers, and the plurality of switches assigned to the plurality of virtual domains in a root domain.

9. The computer system of claim 1, wherein the root controller is configured to:
   receive a request for instantiating a new tenant network; and
   add a new virtual domain according to the received request.

10. The computer system of claim 1, wherein each switch of the plurality of switches has a plurality of physical, virtual, or physical and virtual interfaces.

11. The computer system of claim 1, wherein the root controller, the back-up root controller, the network controllers, and the back-up network controllers are comprised in a software-defined network controller.

12. A method for dynamically adapting a software-defined network, wherein the software-defined network is partitioned into a plurality of virtual domains, each virtual domain of the plurality of virtual domains comprising a network controller to which a backup network controller is assigned, wherein the software-defined network comprises a root controller, wherein a back-up root controller is assigned to the root controller, wherein the back-up root controller is configured to monitor the root controller and to determine a fault of the root controller, and wherein the back-up root controller is configured to take over management of the software-defined network, the method comprising:

managing, by the network controller, a plurality of switches being assigned to the respective virtual domain; and managing the software-defined network, the managing of the software-defined network comprising dynamically adding, removing, or adding and removing virtual domains based on a threshold of the software-defined network.

13. In a non-transitory computer-readable storage medium that stores instructions executable by at least one computer to dynamically adapt a software-defined network, wherein the software-defined network is partitioned into a plurality of virtual domains, each virtual domain of the plurality of virtual domains comprising a network controller to which a backup network controller is assigned, wherein the software-defined network comprises a root controller, wherein a back-up root controller is assigned to the root controller, wherein the back-up root controller is configured to monitor the root controller and to determine a fault of the root controller, and wherein the back-up root controller is configured to take over management of the software-defined network, the instructions comprising:

managing, by the network controller, a plurality of switches being assigned to the respective virtual domain; and managing the software-defined network, the managing of the software-defined network comprising dynamically adding, removing, or adding and removing virtual domains based on a threshold of the software-defined network.

* * * * *